US011063616B2

(12) United States Patent
Scott et al.

(10) Patent No.: US 11,063,616 B2
(45) Date of Patent: Jul. 13, 2021

(54) SINGLE CLOCK TIMESHARED CHANNELIZER CIRCUIT

(71) Applicant: RAYTHEON COMPANY, Waltham, MA (US)

(72) Inventors: Alexander Scott, Redondo Beach, CA (US); Daniel Thompson, Hermosa Beach, CA (US); Harry B. Marr, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 275 days.

(21) Appl. No.: 16/043,684

(22) Filed: Jul. 24, 2018

(65) Prior Publication Data

US 2020/0036398 A1 Jan. 30, 2020

(51) Int. Cl.
*H04B 1/00* (2006.01)
*G01S 7/288* (2006.01)
*G01S 13/04* (2006.01)
*H04B 7/08* (2006.01)
*G01S 7/295* (2006.01)

(52) U.S. Cl.
CPC .............. *H04B 1/001* (2013.01); *G01S 7/288* (2013.01); *G01S 7/295* (2013.01); *G01S 13/04* (2013.01); *H04B 1/0021* (2013.01); *H04B 7/0817* (2013.01); *G01S 2007/2883* (2013.01); *G01S 2007/2886* (2013.01)

(58) Field of Classification Search
CPC ....... H04B 1/001; H04B 1/0021; G01S 7/288; G01S 7/295; G01S 13/04; G01S 2007/2883; G01S 2007/2886
See application file for complete search history.

(56) References Cited

U.S. PATENT DOCUMENTS

| 5,198,748 A | 3/1993 | Tsui et al. |
| 5,577,031 A | 11/1996 | Smith |
| 6,792,057 B2 | 9/2004 | Kabel et al. |

(Continued)

OTHER PUBLICATIONS

International Search Report and Written Opinion for PCT/US2019/041292; Application filed Jul. 11, 2019; dated Oct. 15, 2019 (14 pages).

(Continued)

*Primary Examiner* — Erin F Heard
*Assistant Examiner* — Donald H B Braswell
(74) *Attorney, Agent, or Firm* — Cantor Colburn LLP

(57) ABSTRACT

An RF detection system includes a signal routing processor and a dynamically reconfigurable channelizer. The signal routing processor selects an operating mode of the RF detection system among a plurality of different operating mode. The dynamically reconfigurable channelizer invokes the selected operating mode in response to a routing control signal output by the signal routing processor. The dynamically reconfigurable channelizer includes a plurality of signal processing resources and a crossbar switching circuit. The crossbar switching circuit includes a signal input to receive an input signal and a signal output to output a final processed signal indicating a detected object. The crossbar switching circuit selectively establishes a plurality of different signal routing paths that connect the plurality of signal processing resources to the signal input and signal output.

20 Claims, 9 Drawing Sheets

(56) References Cited

U.S. PATENT DOCUMENTS

| | | | |
|---|---|---|---|
| 6,898,235 B1 | 5/2005 | Carlin et al. | |
| 2010/0173586 A1* | 7/2010 | McHenry | H04L 27/0006 455/62 |
| 2011/0110473 A1* | 5/2011 | Keehr | H04B 1/1018 375/350 |
| 2012/0302180 A1 | 11/2012 | Rofougaran | |
| 2014/0133603 A1 | 5/2014 | Velazquez | |
| 2015/0365185 A1* | 12/2015 | Thompson | H04B 1/001 370/535 |
| 2016/0087335 A1* | 3/2016 | Marr | H01Q 3/00 342/368 |
| 2018/0019831 A1 | 1/2018 | Zhang | |
| 2018/0024234 A1* | 1/2018 | Ishida | G01S 7/02 342/152 |

OTHER PUBLICATIONS

Devi, P. Kalpana, et al. "FPGA implementation of coefficient decimated polyphase filter bank structure for multistandard communication receiver." Journal of Theoretical and Applied Information Technology 20th 64.2 (2014): 298-306.

Example of Pentex crossbar fabric used with PCIe serial Rapid IO, Model 5350, Pentek, Inc. (Jun. 2011) 3 pages.

Krishna, P. M. et al. "Polyphase Channelizer Demystified" Lecture Notes, IEEE Signal Processing Magazine, Jan. 2016, 33(1), 144-150.

Smitha, K. G. et al. "A low complexity reconfigurable multi-stage channel filter architecture for resource-constrained software radio handsets." Journal of Signal Processing Systems 62.2 (2011): 217-231.

\* cited by examiner

SINGLE CLOCK TIMESHARED CHANNELIZER CIRCUIT

BACKGROUND

The present disclosure relates to electronics, and more specifically, to signal processing techniques to facilitate the detection of objects.

Radio frequency (RF) processing system are capable of establishing a wideband spectrum capable of detecting an emitter object (e.g., a threat such as air, ground, sea, and/or space radar). Hardware implementations for wideband systems cannot keep up with demanding bandwidth requirements. Therefore, a channelizer may be used to reduce a band into sub-bands, where each of the sub-bands is processed on parallel channels.

Channelizer circuits are designed for static channels and are defined at compile time. However, dynamic channels are needed to react to an ever-changing RF environment. For example, the emitter object to be detected can effectively hop center frequencies and possibly, at least temporarily, elude detection. Furthermore, the emitter object or threat might only be detectable for short periods of time (e.g., a so-called pop-up or pulse object/threat). Conventional receiver architectures may fail to capture such pop-up or pulse objects/threats.

SUMMARY

According to a non-limiting embodiment, an RF detection system includes a signal routing processor and a dynamically reconfigurable channelizer. The signal routing processor selects an operating mode of the RF detection system among a plurality of different operating mode. The dynamically reconfigurable channelizer invokes the selected operating mode in response to a routing control signal output by the signal routing processor. The dynamically reconfigurable channelizer includes a plurality of signal processing resources and a crossbar switching circuit. The crossbar switching circuit includes a signal input to receive an input signal and a signal output to output a final processed signal indicating a detected object. The crossbar switching circuit selectively establishes a plurality of different signal routing paths that connect the plurality of signal processing resources to the signal input and signal output According to another non-limiting embodiment, a dynamically reconfigurable channelizer included in an RF detection system is provided. The dynamically reconfigurable channelizer comprises a plurality of signal processing resources, and a crossbar switching circuit. The crossbar switching circuit includes a signal input to receive an input signal and a signal output to final processed signal. The crossbar switching circuit is configured to selectively establish a plurality of different signal routing paths that connect the plurality of signal processing resources to the signal input and signal output. The crossbar switching circuit further reconfigures an established signal routing path based on a control signal generated from an electronic signal routing processor, thereby reconfiguring at least one of a size and an operating mode of the dynamically reconfigurable channelizer.

According to yet another non-limiting embodiment, a method of operating a radio frequency (RF) detection system to detect an object is provided. The method comprises receiving an input signal at the RF detection system, and generating, via a signal routing processor, a routing control signal to select an operating mode of the RF detection system among a plurality of different operating modes. The method further comprises delivering the input signal to a signal input of a crossbar switching circuit, and selectively reconfiguring, via the crossbar switching circuit, a signal routing path based on the routing control signal. The signal routing path connects a plurality of signal processing resources to the signal input and a signal output of the crossbar switching circuit to invoke the selected operating mode. The method further comprises outputting from the signal output a processed signal that indicates a detected object.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
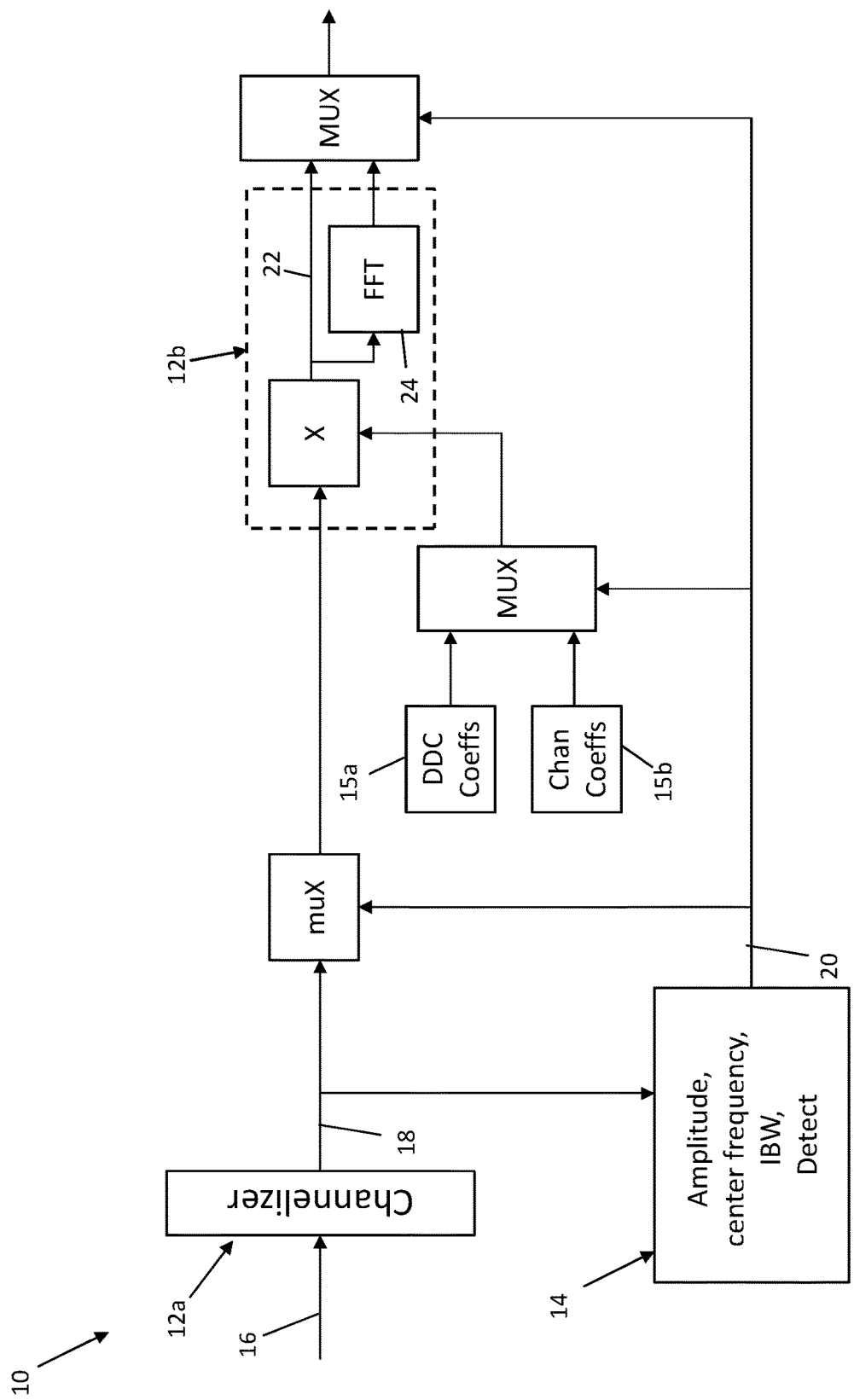
FIG. 1 is a block diagram of an RF object detection system according to a non-limiting embodiment.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Turning to an overview of the relevant technical concepts, many digital system personalities are required to address an array of applications including radar, electronic warfare (EW), and electronic signal communications. For example, in some cases, medium dynamic range with a wide bandwidth is desired for EW applications, but a high dynamic range with a small bandwidth is desired for radar-specific applications. Radar systems are expected to operate in different modes. Each mode requires different performance specifications and thus is typically implemented using different processing techniques which are tailored to a given application.

Conventional RF systems require large bandwidth and heterogeneously channelized signals. A digital receiver including a field-programmable gate array (FPGA) can implement these channelizers, however the circuits are very complex and utilize a large amount of logic resources. Current state-of-the art RF systems employ multi-layer channelizers to manage the complex circuitry. These RF systems, however, utilize multiple clock domains which pose many design challenges with metastability.

Some known RF systems also do not provide a "one processor fits all" paradigm, or a solution to quickly time multiplex between multiple solutions at the nanosecond (ns) timescale for multifunction applications where radar, EW, and electronic signal communications are performed simultaneously. Some known systems attempt to achieve simultaneous processing performance by processing the input signal with a digital down converter (DDC) prior to performing channelization using a separate (i.e., independent) channelizer. However, implementing a separate DDC and channelizer in the same design consumes excessive FPGA resources, which further constrains processing resources.

Various non-limiting embodiments of apparatuses, systems, and methods are described herein, which provide a multistage channelizer that utilizes a single clock domain throughout the design, while still providing high bandwidth capability. In this manner, design complexity of the RF system can be significantly reduced. The RF system also implements a digital receiver that utilizes an FPGA to establish a multi-mode, multistage channelizer. The channelizer can selectively operate in either a narrow spectrum mode (multi-stage mode) or a wide spectrum mode (single-stage mode) to provide large bandwidth and heterogeneously channelized signals. In at least one embodiment, the FPGA resources are time-shared among several individual stages (e.g., the second stage) of the multistage channelizer. In this manner, an efficient approach for generating a channelizer of any size and allowing for dynamic reconfiguration of filtering coefficients. In addition, sharing the FPGA resources across additional stages, for example in the second stage, allows the system to conserve logical resources, remove multiple clock domain crossings, reduce clock switching noise, and reduce circuit routing challenges to produce a smaller packaged FPGA.

With reference now to FIG. 1, an RF object detection system 10 is illustrated according to a non-limiting embodiment. The RF object detection system 10 includes a first stage digital channelizer circuit 12a, signal processing circuit 14, and a second stage digital channelizer circuit 12b. The first stage digital channelizer circuit 12a receives an input signal 16 from an object to be detected and having an initial frequency (e.g., 3.2 GHz). The first stage digital channelizer circuit 12a can bandpass filter the input signal 16, and convert the input signal 16 to a lower frequency to alias the input signal 16 down to baseband. For example, the input signal 16 can be digitized at a center frequency of about 200 MHz to about 210 MHz. The digitized signal 18 (i.e., the input signal 16 digitized at about 200 MHz to about 210 MHz) can then be aliased down to a targeted sampling window, e.g., to approximately a 50 MHz sampling window. In at least one embodiment, the first stage digital channelizer circuit 12a generates a number of real value output signals represent individual output channels (e.g., 16 channels), which are centered, or are output "at baseband". For example, the first stage channelizer 12a takes the input signal 16 (e.g., 3.2 GHz sample signal ($f_s$) that is polyphased by 16 at 200 MHz) and filters down to 16 channels with a 200 MHz Bandwidth, centered at baseband of the digitized signal 18.

The first stage and second stage digital channelizer circuits 12a and 12b are also configured to selectively operate in a "DDC mode" or a "Channelizer mode." When operating in the channelizer mode, for example, the first stage digital channelizer circuit 12a and/or the second stage digital channelizer circuit 12b can utilize DDC coefficient parameters 15a and/or channelizer coefficient parameters 15b to generate a plurality of individual complex RF channels. Each complex RF channel has a channel size defined by a bandwidth and a gain. When invoking the DDC mode, however, the first stage digital channelizer circuit 12a and/or the second stage digital channelizer circuit 12b utilizes a bypass signal path 22 to bypass a FFT circuit 24 and generate a parallelization of a selected individual channel. In at least one non-limiting embodiment, the "parallelization" signal processing operation can be defined as polyphasing the representation of a selected channel among the plurality of channels (e.g., 16 channels).

The signal processing circuit 14 receives the digitized signal 18 from the first stage digital channelizer circuit 12a and determines various signal characteristics including, but not limited to, signal amplitude, center frequency, instantaneous bandwidth (IBW). The determined signal characteristics 20 are output by the signal processing circuit 14 and can be mixed with the digitized output 18 to bring the output 18 to baseband.

The determined signal characteristics 20 are also utilized to select the operating mode (i.e., the "DDC mode" or the "Channelizer mode") of the first stage digital channelizer circuit 12a and/or the second stage digital channelizer circuit 12b. For example, when the IBW is less than or equal to a bandwidth threshold value, the first stage digital channelizer circuit 12a and/or the second stage digital channelizer circuit 12b can be invoked to operate in the "DDC mode". When, however, the IBW exceeds the bandwidth threshold value, the first stage digital channelizer circuit 12a and/or the second stage digital channelizer circuit 12b can be invoked to operate in the "Channelizer mode".

Figure 2:
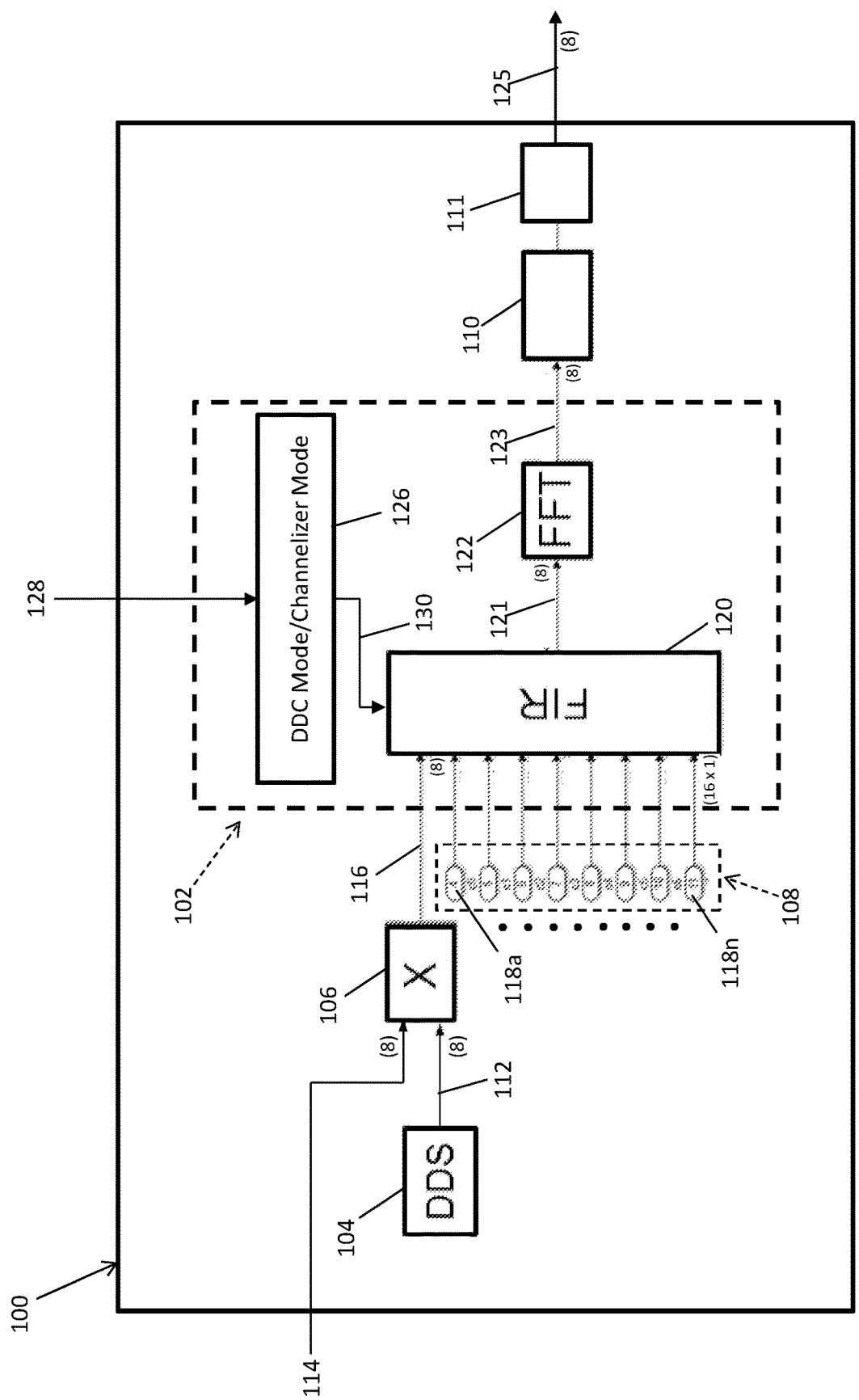
FIG. 2 is a block diagram of a digital receiver including a dynamically reconfigurable channelizer according to a non-limiting embodiment.

Turning now to FIG. 2, a digital channelizer circuit 100 included in the RF object detection system 10 is illustrated according to a non-limiting embodiment. The digital channelizer circuit 100 includes a multichannel, a dynamically reconfigurable channelizer 102, a digital synthesizer 104, a signal mixer 106, a coefficient input module 108, an electronic digital mixer 110, and a DDC controller 111. The digital synthesizer 104 can be constructed as a direct/discrete digital synthesizer (DDS), and generates a local oscillating (LO) frequency signal 112 (e.g., sinewave) according to parameters (e.g., a selected frequency) set by a LO control circuit (not shown). The LO frequency signal 112 is utilized to actively tune a center of frequency of a selected channel. The signal mixer 106 is in signal communication with the digital synthesizer 104, and mixes the LO frequency signal 112 with a targeted RF input signal 114 to generate a mixed output signal 116 having a shifted frequency with respect to the frequency of the targeted RF input signal 114. The RF input signal 114 can be the input signal 16 of FIG. 1 and can be received as a real value or a complex value including a real component (I) and an imaginary component (Q). The shifted frequency set by the mixed output signal 116 output by the mixer 106 allows for selecting a center frequency of a selected channel of the channelizer 102.

The dynamically reconfigurable channelizer 102 is in signal communication with the mixer 106 and the coefficient input module 108. The mixer 106 delivers the mixed output signal 116 to the dynamically reconfigurable channelizer 102. The coefficient input module 108 outputs one or more coefficient parameters 118a-118n. The coefficient parameters 118a-118n can modify a characteristic of one or more complex RF channels input to the dynamically reconfigurable channelizer 102. The characteristics include, but are not limited to, a selected non-zero frequency, a gain, and a selected center frequency. For example, the coefficient parameters 118a-118n can be digitally set to create a bandpass filter for passing a signal at a certain non-zero frequency, to select a center frequency value, etc. In at least one embodiment, the coefficient parameters 118a-118n are generated at 10-bit resolution and operate at 89 mW active power with bias set for a 70 dB dynamic range. The coefficient parameters 118a-118n can be set to a low pass configuration with a fixed cutoff frequency that is the ratio of the sampling frequency, $f_s$, to the number of channels (m) (e.g. $f_{cutoff}=f_s/m$). Accordingly, the coefficient parameters 118a-118n can be actively changed so that the cutoff frequency is less or more than $f_s/m$.

The dynamically reconfigurable channelizer 102 includes an adaptive filter 120, and one or more Fourier transfer (FFT) circuits 122. The adaptive filter 120 is an adaptive (i.e., tunable) polyphase decimating finite impulse response (FIR) filter array. The adaptive filter 120 processes one or more input signals delivered from the mixer 106, such as a complex RF input signal (I, Q), for example, and generates one or more filtered output RF signals. The adaptive filter 120 may operate as a bandpass filter, high-pass filter, or a low-pass filter, as needed, so as to independently adapt (i.e., tune) an individual channel.

The dynamically reconfigurable channelizer 102 also utilizes memory mapped transactions of filter coefficients and data for dynamic re-configuration during operation. In at least one embodiment, the channelizer 102 includes a multi-stage filter-shape crossbar switching circuit (not shown in FIG. 2), which allows real time switching (e.g., less then about 10 ns) of filtering characteristics in a multi-stage channelizer approach. These filtering characteristics can be switched and/or shared between stages of the channelizer 102. Accordingly, data and coefficients can be routed to selectively operate the channelizer 102 in a single-stage mode or a multi-stage mode. The single-stage mode operates the channelizer 102 as a single-stage channelizer with a wide bandwidth for detecting a signal. The multi-stage mode operates the channelizer 102 as a multi-stage channelizer with a narrow bandwidth. A trigger circuit (not shown in FIG. 2) can also be provided to switch coefficients as a signal is propagating through the channelizer 102. In this manner, one stage (e.g., the first stage) can inform which characteristics should be switched in through the next stage (e.g., the second stage).

One or more FFT circuits 122 are in signal communication with the adaptive filter 120, and receive one or more complex RF output channels 121 from the adaptive filter 120. The RF output channels 121 input to the FFT circuit 122 are simultaneously represented as a filtered "polyphased" response. Based on the complex RF channels 121, the FFT circuit 122 generates a number of real value output signals, or output channels 123. Following output from the FFT circuit 122, the output channels 123 are centered, or are output "at baseband".

Figure 3:
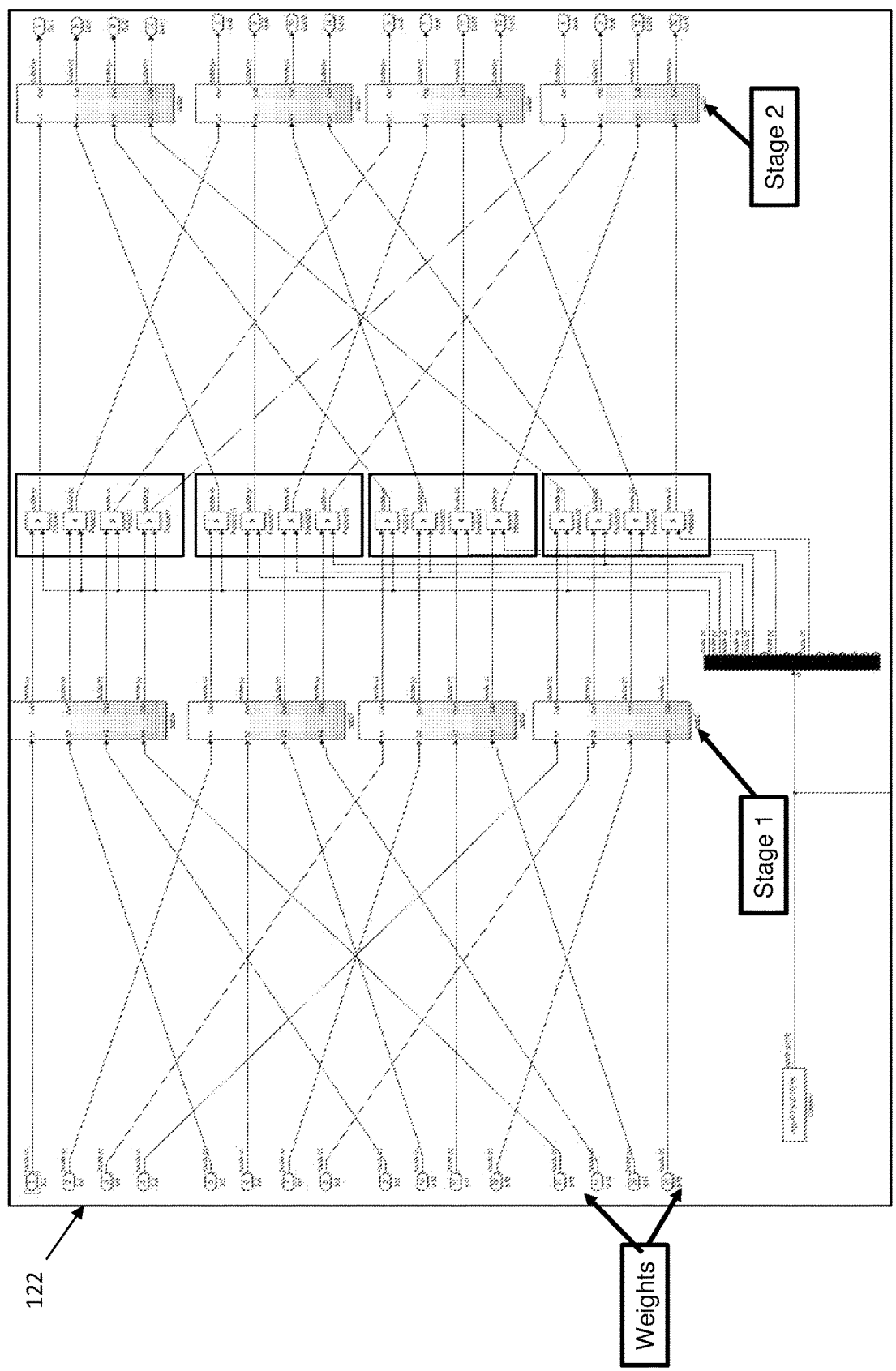
FIG. 3 is a diagram of a multi-stage fast Fourier transform circuit included in the reconfigurable channelizer according to a non-limiting embodiment.

In at least one embodiment, the FFT circuit 122 can include a multi-stage FFT circuit (see FIG. 3). For example, the FFT circuit 122 can be implemented as a Radix-4 FFT that is cascaded to multiple stages. In this manner, a larger FFT circuit (e.g., a Radix-16 FFT) can be constructed. The radix-4 configuration performs a radix-4 algorithm, which effectively combines two stages of a radix-2 FFT into a single stage, thereby reducing the number of total stages. To achieve a radix-16 FFT, the radix-4 takes log 4 16=2 stages.

The Modular FFT circuit implementation can be constructed using multiple Radix-4 FFT circuits. The Radix-4 FFT circuits can be cascaded together to construct larger FFT implementations for variously sized channelizers. The flexibility of the Radix 4 implementation allows for easy reconfiguration of the channelizer 102.

Returning to FIG. 2, the electronic digital mixer 110 is in signal communication with the FFT circuit 122 to receive the output channels 123, i.e., the baseband channel signals 123. The digital mixer 110 can digitally convert a digitized, band limited signal to a lower frequency signal at a lower sampling rate. In at least one embodiment, the digital mixer 110 samples the output channels 123 according to a sample clock rate. In at least one embodiment, the digital mixer 110 compensates for the frequency space when an "oversampled" channelizer is embodied. In the manner, the digital mixer 110 can correct a frequency offset and ensures that the output of digital mixer 110 is substantially at baseband.

The DDC controller 111 is provided downstream from the digital mixer 110 and can generate a decimated baseband output signal 125 that can be further bit packaged, tagged and analyzed. In some embodiments, the decimated baseband output signal 125 is a polyphased output signal, while in other embodiments the decimated baseband output signal 125 is not polyphased.

The dynamically reconfigurable channelizer 102 further includes a mode selector module 126. The mode selector module 126 receives a mode select signal 128 (e.g., input by a user, and/or based on detected signal characteristics) which indicates a selected operating mode of the dynamically reconfigurable channelizer 102 from among a plurality of different operating modes. The selected mode of the dynamically reconfigurable channelizer 102 can also be automatically selected based on the characteristics of the mixed output signal 116 or can be manually selected.

The available operating modes indicated by the mode select signal 128 include, for example, a radar mode, an EW mode, communications mode. When operating in the radar mode or the communications mode, for example, the dynamically reconfigurable channelizer 102 performs DDC to decimate mixed output signal 116 to a lower bandwidth. When operating in the EW mode, for example, the dynamically reconfigurable channelizer 102 operates to decimate sub-bands of the mixed output signal 116 and output a full spectrum coverage of the full spectrum of the RF input signal 114, or a subset of the full spectrum. In response to the mode select signal 128, the mode selector module 126 outputs a mode command signal 130 that commands the adaptive filter 120 to operate according to the mode indicated by the mode select signal 128. For example, in response to invoking the channelizer mode, the adaptive filter 120 utilizes the coefficient parameters 118a-118n to generate a plurality of individual complex RF output channels 121. Each complex RF output channel 121 has a channel size defined by a bandwidth and a gain.

When invoking the DDC mode, however, the adaptive filter 120 generates a parallelization of a selected individual channel. In at least one non-limiting embodiment, the "parallelization" signal processing operation can be defined as polyphasing the representation of a selected channel among a plurality of input channels. Accordingly, when operating in the DDC mode, the dynamically reconfigurable channelizer 102 can adjust at least one of the bandwidth, the gain and the center frequency of an individual complex RF output channel 121 based on the coefficient parameters 118a-118n and/or the mixed output signal 116 to change the channel size and/or center frequency of an individual complex RF output channel 121 or targeted complex RF output channel 121.

Figure 4:
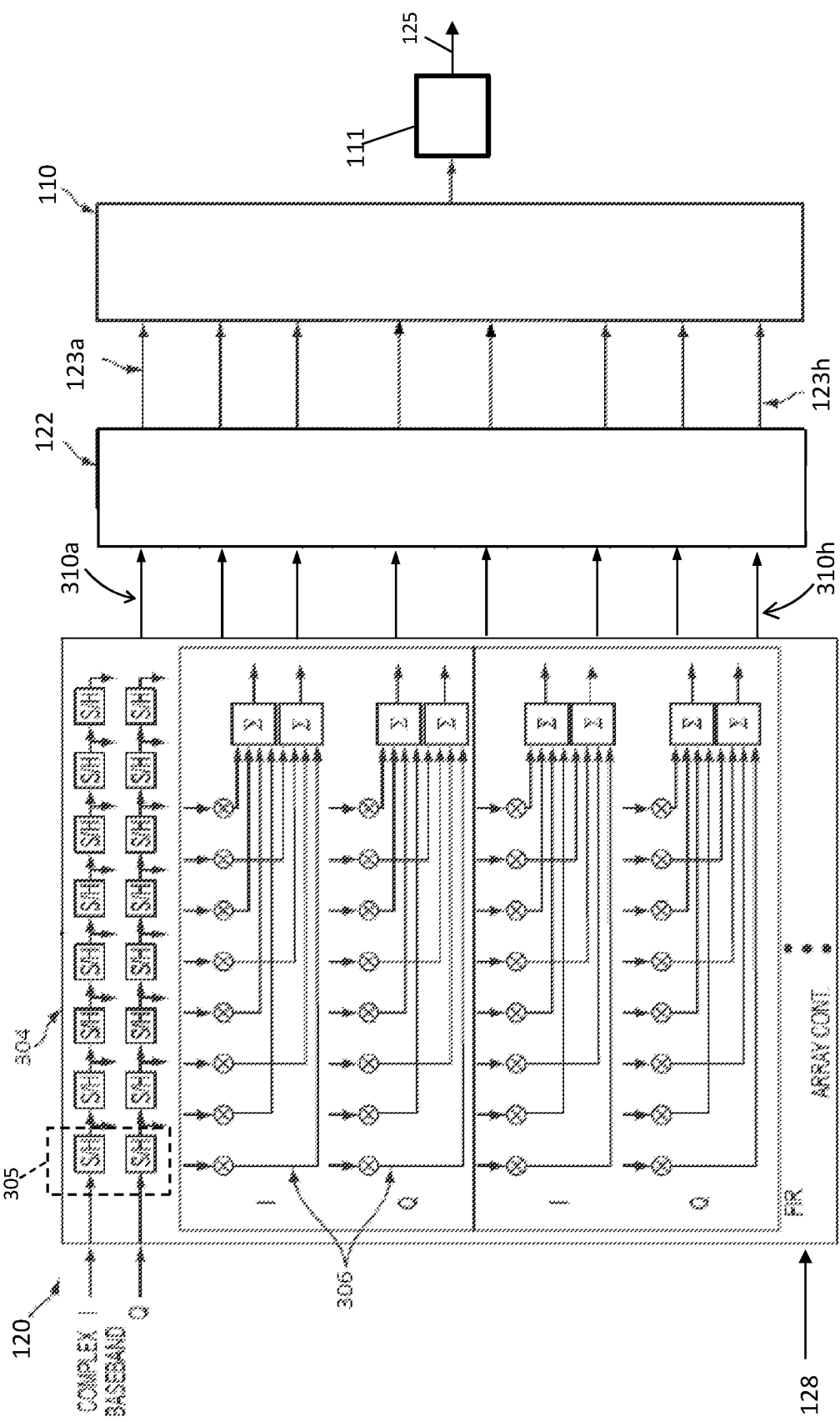
FIG. 4 is a block diagram of an adaptive filter included in a dynamically reconfigurable channelizer according to a non-limiting embodiment.

With reference to FIG. 4, an adaptive filter 120 constructed as a polyphase FIR filter array is illustrated according to a non-limiting embodiment. The adaptive filter 120 can include 16 taps and can be driven by a 3.25 gigahertz (GHz) clock. The analog bandwidth of the adaptive filter 120 may reach up to 12 GHz. In at least one embodiment, the adaptive filter 120 is capable of converting a plurality of polyphase signals into one or more up-sampled baseband channels (e.g., I/Q channels).

The adaptive filter 120 further includes a plurality of sample and hold (S/H) circuits 304. In at least one embodiment, the S/H circuits are arranged in pairs 305 that correspond to a respective pair of I/Q channels. Each S/H pair 305 also corresponds to a real output channel 123a-123h. In at least one non-limiting embodiment, the S/H output signals are routed to a plurality of FIR filter branches 306 which are in signal communication with the FFT circuit 122. The filter branches 306 can be dynamically tapped to actively reconfigure the adaptive filter 120.

The FFT circuit 122 receives from the adaptive filter 120 one or more baseband channels such as, I/Q channels 310a-310h, for example, and generates a number of real output channels 123a-123h The real output channels 123a-123h are delivered to the digital mixer 110 which samples one or more of the real output channels 123a-123h. For example, a first real output channel 123a is output on a first clock cycle, a second real output channel 123b is output on a second clock cycle, etc. The real output channels 123a-123h can be up-sampled and are clocked at 3.25 GHz rate, for example. The DDC controller 111 combines the real output channels 123a-123h to form a decimated RF output signal 125 that is clocked at, for example, 26 GHz. In one or more embodiments, the adaptive filter 120 and the FFT circuit 122 are clocked at 3.25 GHz, for example, and the digital mixer 110 is clocked at, for example, 26 GHz.

In at least one embodiment, the DDC controller 111 is disposed as the last stage. Thus, the adaptive filter 120 can selectively apply a first decimation to a mixed complex RF input signal, i.e., when the DDC mode is invoked via mode select signal 128. The output of the adaptive filter 120 is then converted into real output channels 123a-123h via the FFT circuit 122, for example, which can be further decimated into a decimated output signal 125 generated by the DDC controller 111. It should be appreciated that any number of the real output channels 123a-123h can be used. Accordingly, if the adaptive filter 120 allows four sets of complex RF input channels and data is only provided through one of the channels, the other remaining channels can be "grounded" and left unused. A number of digital to analog converters can be included to provide the inputs to these complex baseband channels into the adaptive filter 120.

According to at least one embodiment, the adaptive filter 120 shown in FIG. 4 can be used to implement down conversion to baseband and filtering, known as bandpass sampling. The coefficient parameters 118 of the adaptive filter 120 can be digitally set via the coefficient input module 108 (not shown in FIG. 4), for example. Accordingly, the adaptive filter 120 provides a very flexible filter capable of implementing an arbitrary filter shape, which is controlled by the number of filter taps. In at least one embodiment, the coefficient parameters 118 are set to create a bandpass filter to pass a signal at a certain non-zero frequency.

Various subsampling techniques can then be used such that once the signal is bandpass filtered. In at least one embodiment, a sampling rate much lower than the Nyquist criterion can be used to alias the signal down to baseband. For example, an initial signal with bandwidth of about 10 megahertz (MHz) can be digitized at a center frequency of about MHz 200 to about 210 MHz by utilizing the adaptive filter 120 as a bandpass filter that is set at approximately 200 MHz to approximately 210 MHz. The resulting signal can then be sampled at approximately 50 MHz, for example. The digitized signal (i.e., the signal digitized at about 200 MHz to about 210 MHz) is aliased down to approximately a 50 MHz sampling window. It should be appreciated that the frequency values described above are merely examples, and that other frequencies may be implemented. A low-pass filter can then be applied to the sampled signal to filter out the aliases thereby obtaining the information that was carried on the digitized signal. In this manner, the adaptive filter 120 is utilized to bandpass filter and then downsample the initial signal.

Figure 5:
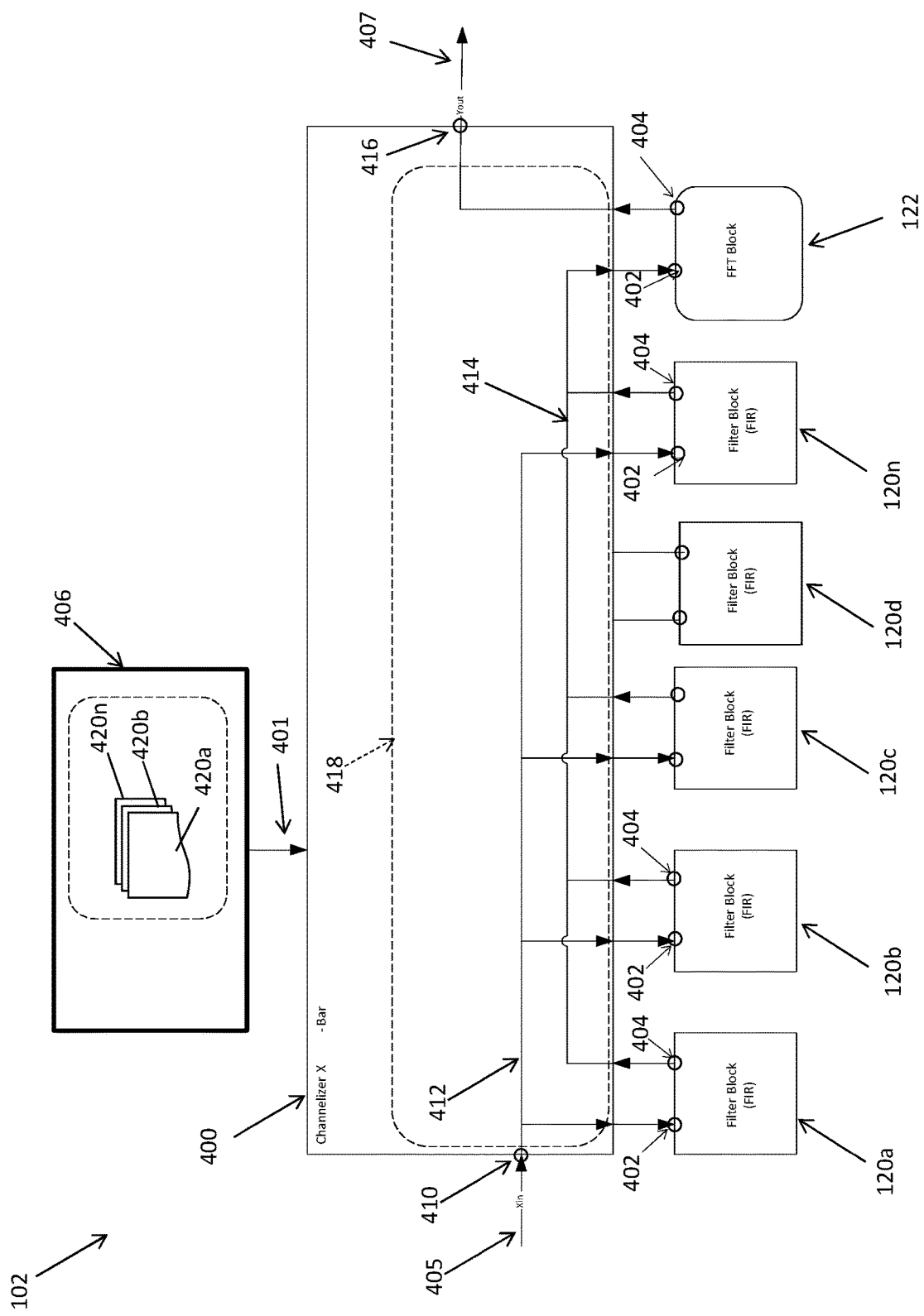
FIG. 5 is a block diagram of a dynamically reconfigurable single-stage channelizer according to a non-limiting embodiment.

Turning now to FIG. 5, a dynamically reconfigurable channelizer 102 including a multi-stage filter-shape crossbar switching circuit 400 is illustrated according to a non-limiting embodiment. The multi-stage filter-shape crossbar switching circuit 400, referred to herein as a "crossbar switch", can be implemented using an FPGA and is configured to connect several memory-mapped signal processing resources together. The memory-mapped resources can be connected according to various configurations to dynamically configure the channelizer 102 with a desired architecture or size. Each signal processing resource has its own input signal address and output signal address. Different combinations of resource input signal addresses and output signal address can be utilized to reconfigure the path of the input signal such that different resource combinations are utilized, thereby implementing a channelizer 102 with a desire size and desired operating mode. The resource connections can also be dynamically reconfigured (e.g., in less than 10 ns) to actively reconfigure the channelizer 102 in real-time.

Still referring FIG. 5, the dynamically reconfigurable channelizer 102 also includes a plurality of signal processing resources 120a, 120b, 120c, 120d, 120n, 122, and a signal routing processor 406. The signal processing resources including, but are not limited to, one or more adaptive filters circuits 120a, 120b, 120c, 120d, 120n, and one or more FFT circuits 122. Each signal processing resource 120a, 120b, 120c, 120d, 120n and 122 includes a respective resource input 402 and a respective resource output 404. The resource input 402 has assigned thereto a unique input signal address, and is configured to receive an input signal 405. The input signal 405 includes, for example, signal characteristics and filter coefficients. The signal characteristics include, but are not limited to, signal amplitude, center frequency, instantaneous bandwidth (IBW). The resource output 404 has assigned thereto an output signal address, and is configured to output a processed signal 407 resulting from the signal processing operation applied by the respective signal processing resource 120a, 120b, 120c, 120d, 120n and 122.

The crossbar switching circuit 400 is in signal communication with each signal processing resource 120a, 120b, 120c, 120d, 120n and 122. The crossbar switching circuit 400 includes a signal input 410 to receive an input signal 405, a resource input signal path 412, a resource output signal path 414, and a signal output 416 to output a final processed signal 407. The resource input signal path 412 is selectively connected to the resource input 402 of an activated signal processing resource 120a, 120b, 120c, 120d, 120n and 122, and the resource output signal path 414 is selectively connected to the resource output 404 the activated signal processor resource 120a, 120b, 120c, 120d, 120n and 122.

The combination of the resource input signal path 412 and the resource output signal path 414 establishes a signal routing path 418, which controls how the input signal 405 is processed by the activated signal processor resource 120a, 120b, 120c, 120d, 120n and 122. Accordingly, the signal routing path 418 configures the size and/or operating mode of the dynamically reconfigurable channelizer 400. For example, changing the signal routing path 418 switches the operating mode of the channelizer 102 from a first operating mode, e.g., single-stage/channelizer mode) to a second operating mode, e.g., a multi-stage/DDC mode.

The signal routing processor 406 is in signal communication with the crossbar switching circuit 400 and generates a routing control signal 401 that controls the configuration of the signal routing path 418. For example, the signal routing processor 406 selectively connects and disconnects the resource input path 412 to the resource input 402 of each signal processing resource 120a, 120b, 120c, 120d, 120n and 122, and to selectively connects and disconnects the resource output path 414 to the resource output 404 of each signal processing resource 120a, 120b, 120c, 120d, 120n and 122.

In at least one embodiment, the signal routing processor 406 includes one or more signal routing path address lists 420a, 420b, 420n. The signal routing path address lists 420a, 420b, 420n include a plurality of input signal addresses and a plurality of output signal address corresponding to the resource input 402 and resource output 404 of a given signal processing resource 120a, 120b, 120c, 120d, 120n and 122. Each signal routing path address list 420a, 420b, 420n includes a unique combination of input signal addresses and output signal addresses, where each combination of input signal addresses and output signal addresses defines a different target signal routing path 418. For example, a given target signal routing path 418 connects the signal input 410 to the resource input 402 of one or more filter circuits (e.g., 120a, 120b, 120c, 120n), connects the resource output 404 of the filter circuit ((e.g., 120a, 120b, 120c, 120n) to the resource input 402 of one or more FFT circuits (e.g., 122), and connects the resource output 404 of the FFT circuit (e.g., 122) to the signal output 416. Accordingly, each combination of input signal addresses and output signal addresses defines a different target signal routing path 418 that invokes a desired configuration of the dynamically reconfigurable channelizer 102.

Figure 6:
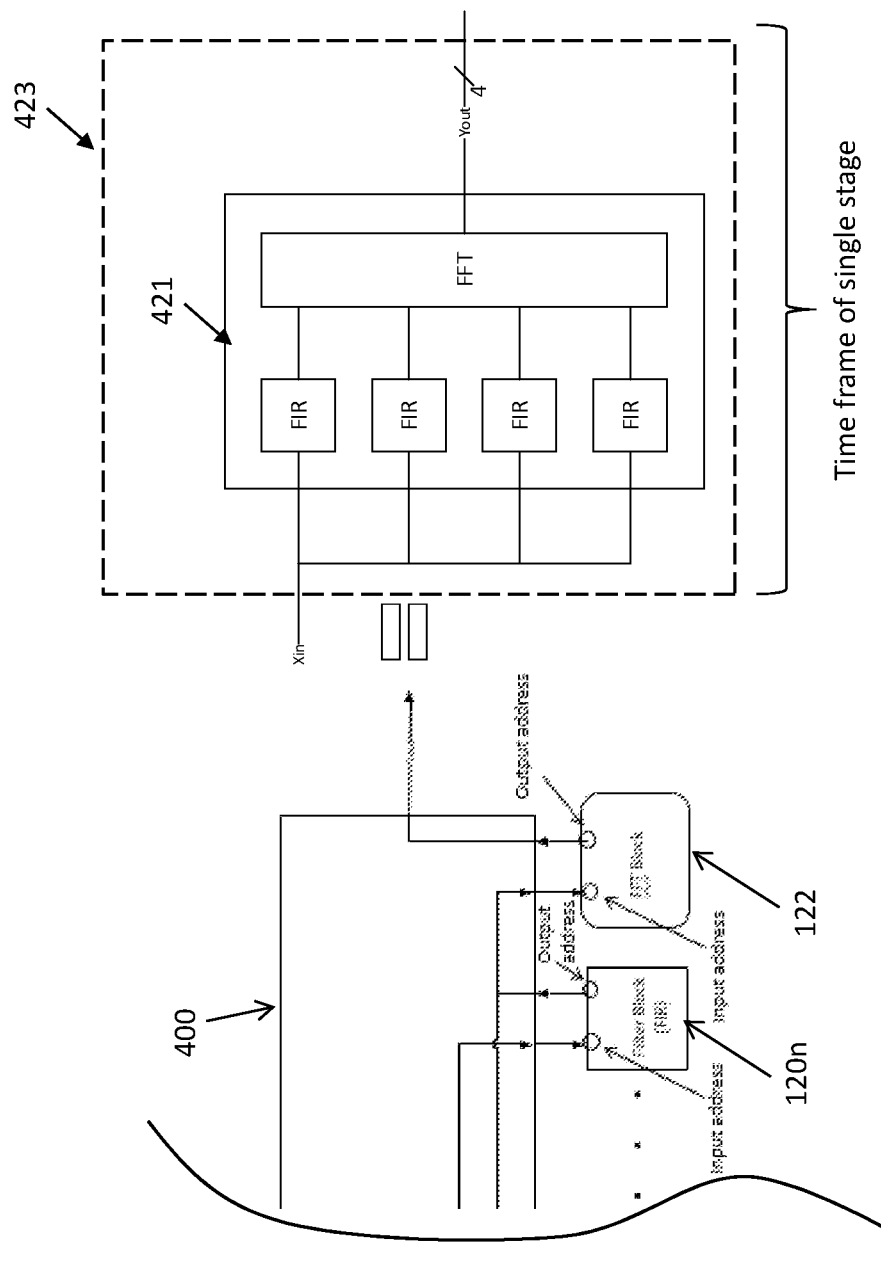
FIG. 6 is conceptual diagram of the dynamically reconfigurable single-stage channelizer illustrated in FIG. 5.

In one example, the signal routing processor 406 commands the crossbar switching circuit 400 to establish a first target signal routing path 418 based on a first combination of input signal addresses and output signal addresses indicated by a first signal routing path address list (e.g., 420a) to invoke a first configuration of the channelizer 102 (see FIGS. 5 and 6). The signal routing processor 406 can then actively command the crossbar switching circuit 400 to establish a second target signal routing path 418 based on a second combination of input signal addresses and output signal addresses indicated by a second signal routing path address list (e.g., 420b) to invoke a second configuration of the channelizer 102 (see FIGS. 7 and 8).

In at least one embodiment, the signal routing processor 406 can communicate with the DDC controller 111. In this manner, the DDC controller 111 can command the signal routing processor 406 to invoke a particular mode (e.g., a "DDC mode" or a "Channelizer mode"), and in turn the signal routing processor 406 can select the corresponding signal routing path address list which establishes the target signal routing path 418 necessary to invoke the operating mode commanded by the DDC controller 111. As described herein, the DDC controller 111 can determine the desired operating mode based on the signal characteristics of the input signal 405. For example, when the IBW of the input signal 405 is less than or equal to a bandwidth threshold value, the DDC controller 111 can command the signal routing processor 406 to configure the crossbar switching circuit 400 to invoke the "DDC mode". When, however, the IBW exceeds the bandwidth threshold value, the DDC controller 111 can command the signal routing processor 406 to configure the crossbar switching circuit 400 to invoke the "Channelizer mode".

Referring to FIGS. 5 and 6, the dynamically reconfigurable channelizer 102 is shown operating in a first configuration, e.g., a single-stage channelizer configuration. While operating in the single-stage channelizer configuration, the channelizer 102 has a channel bandwidth of about 200 MHz, in a current embodiment, the total instantaneous bandwidth of the channelizer 3.2 GHz with 16 channels resulting in 200 MHz bandwidth channels. For 4G LTE and 5G embodiments, this RF bandwidth would match the bandwidth of those applications, around 200 MHz for 4G LTE example and in 5G up to 800 MHz channel bandwidths. In at least one embodiment, the channelizer 102 can utilize coefficient parameters to generate an individual complex RF channel 421 at a single stage 423. The complex RF channel 421 has a channel size defined by a bandwidth and a gain. Accordingly, the channelizer 102 can implement a DDC mode that generates a parallelization of a selected individual channel. In at least one non-limiting embodiment, the "parallelization" signal processing operation can be defined as polyphasing the representation of a selected channel among a plurality of input channels.

Figure 7:
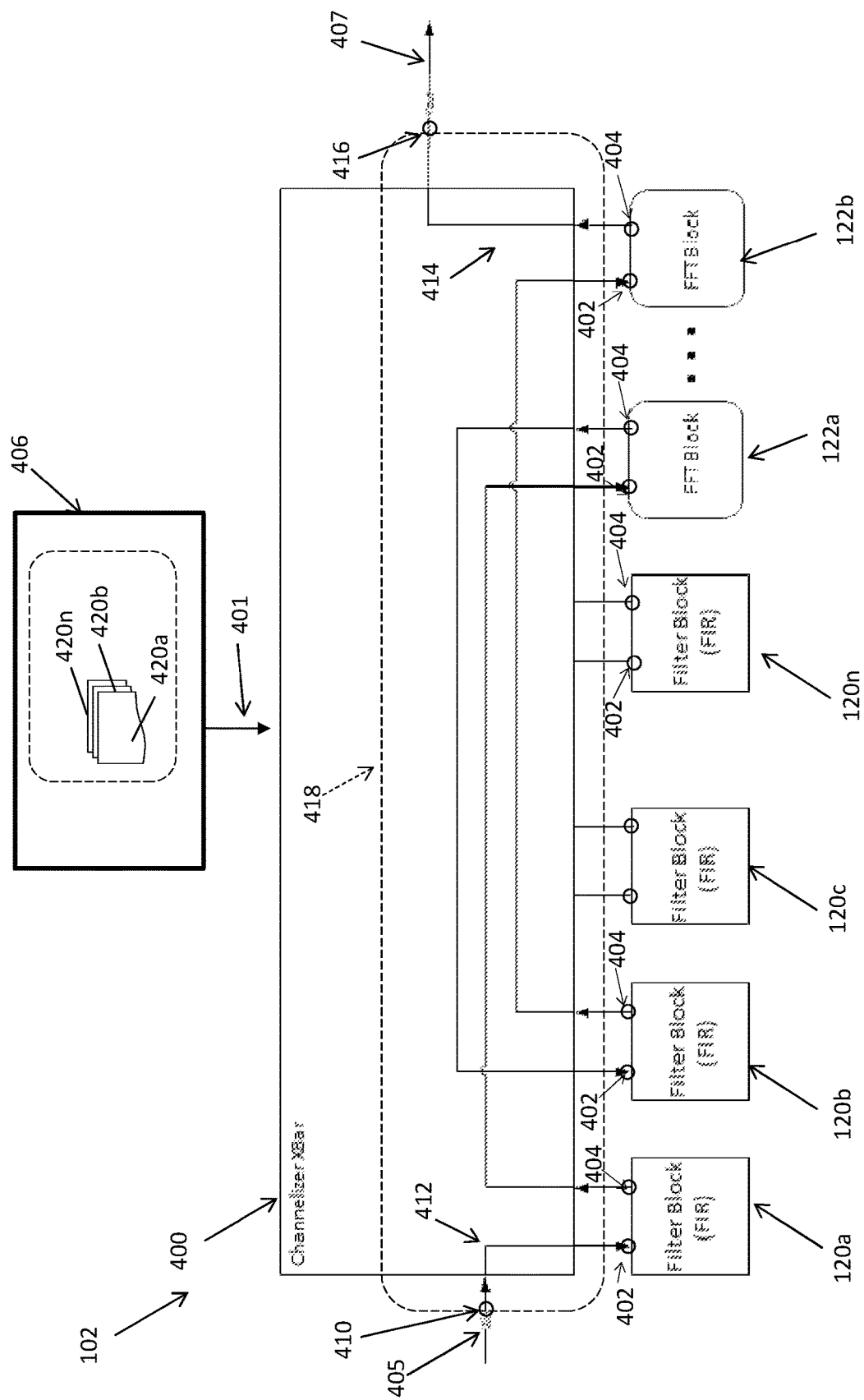
FIG. 7 is a block diagram of a dynamically reconfigurable multi-stage channelizer according to a non-limiting embodiment.
Figure 8:
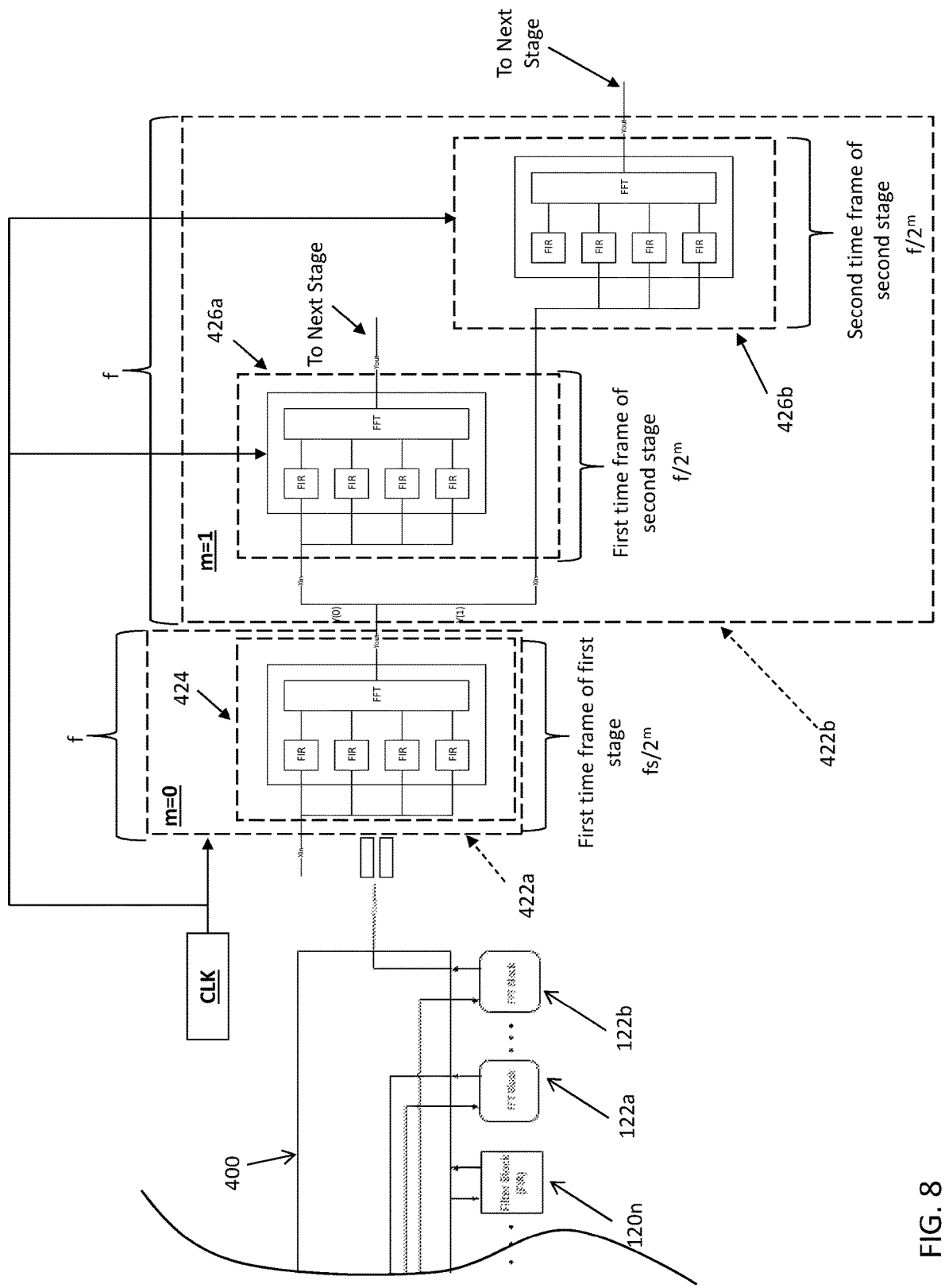
FIG. 8 is conceptual diagram of the dynamically reconfigurable single-stage channelizer illustrated in FIG. 7.

Turning to FIGS. 7 and 8, the dynamically reconfigurable channelizer 102 is shown operating in a second configuration, e.g., a multi-stage channelizer configuration. The signal connections between the signal processing resources 120a, 120b, 120c, 120n, 122a, 122b define individual stages 422a, 422b, 422n, with each stage 422a, 422b, 422n including one or more channels 424, 426a and 426b, etc. While operating in the multi-stage channelizer configuration, the channelizer 102 has a channel bandwidth of about 10 MHz. In an embodiment, the second channelizer is often used to break the output from a first channelizer into even smaller bandwidths. For example if the first channelizer output 200 MHz channels, a second channelizer could be used to decimate this further into 10 MHz channel bandwidths.

Unlike some known channelizers, each channel 424, 426a and 426b, etc. included in a given stage 422a, 422b, 422n of the multi-stage channelizer configuration is driven by a single clock signal having a clock frequency (f). Accordingly, the channels 424, 426a 426b, time share the signal processing resources 120a-120n and 122a-122n. The data rate of the processed data output at a 424, 426a and 426b, etc. of a given stage 422a, 422b, 422n is based on a level (m) of the stage 422a, 422b, 422n. In at least one embodiment, the processed data output at a channel 424, 426a and 426b, etc. of a given stage 422a, 422b, 422n is defined as $(f)/(2^m)$, where "m" is the level of a given stage 422a, 422b, 422n, and "f" is the clock frequency. Accordingly, the 102 can achieve any size and allow for dynamic reconfiguration of filtering coefficients, reducing timing closure complexity and removing clock domain crossings.

Figure 9:
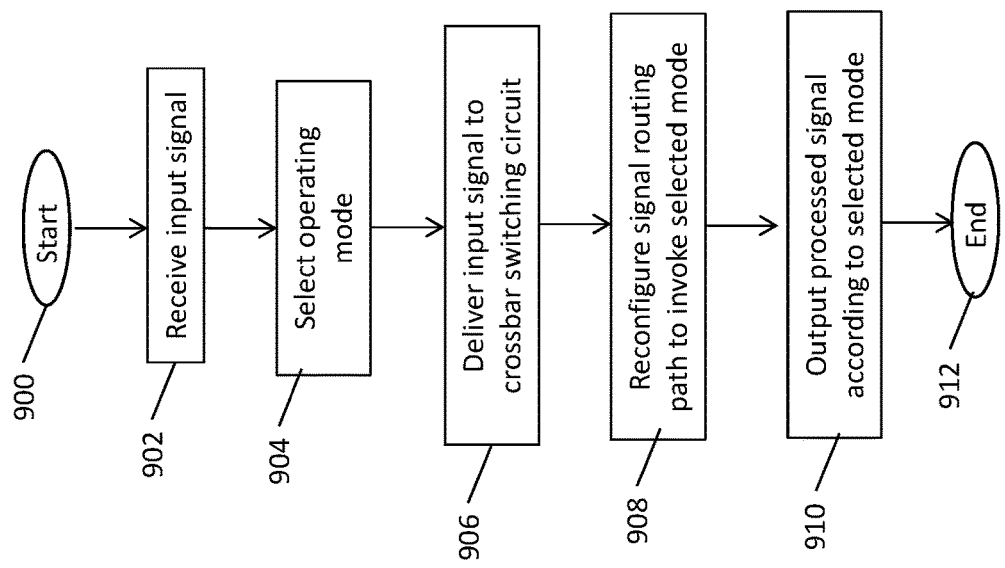
FIG. 9 is a flow diagram illustrating a method of operating a dynamically reconfigurable multi-stage channelizer according to a non-limiting embodiment.

With reference now to FIG. 9, a method of detecting an object using an RF detection system is illustrated according to a non-limiting embodiment. The method begins at operation 900, and at operation 902 an unprocessed input signal is received at the RF detection system. At operation 904, a routing control signal is generated via a routing control processor. The routing control signal selects an operating mode (e.g., a channelizer mode) of the RF detection system among a plurality of different operating modes. At operation 906, the unprocessed input signal is delivered to a signal input of a crossbar switching circuit. At operation 908, the crossbar switching circuit selectively reconfigures a signal routing path based on the routing control signal. The signal routing path connects a plurality of signal processing resources (e.g., filter circuits, FFT circuits, etc.) to the signal input and a signal output of the crossbar switching circuit to invoke a second selected operating mode (e.g., a DDC mode). At operation 910, a processed signal that indicates a detected object is output from the signal output of the crossbar switching circuit, and the method ends at operation 912.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage module capable of storing algorithms, logic or computer executable instruction, and that contains the circuitry necessary to interpret and execute instructions.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An RF detection system comprising:
   an signal routing processor configured to select an operating mode of the RF detection system among a plurality of different operating modes; and
   a dynamically reconfigurable channelizer in signal communication with the signal routing processor and configured to invoke the selected operating mode in response to a routing control signal output by the signal routing processor, the dynamically reconfigurable channelizer comprising:
   a plurality of signal processing resources; and
   a crossbar switching circuit including a signal input to receive an input signal and a signal output to output a final processed signal indicating a detected object, the crossbar switching circuit configured to selectively establish a plurality of different signal routing paths that connect the plurality of signal processing resources to the signal input and signal output,
   wherein the crossbar switching circuit includes a resource output path that selectively connects a resource output of one of the signal processing resources or a combination of resource outputs of the signal processing resources in common with one another.

2. The RF detection system of claim 1, wherein the crossbar switching circuit further comprises:
   an input signal path that connects the signal input in common with a resource input of each signal processing resource among the plurality of signal processing resources; and
   a fast Fourier transform (FFT) circuit including an FFT signal input that is connected to the resource output path and an FFT signal output path that generates at least one real output channel based on at least one resource output signal output from at least one of the signal processing resources,
   wherein the signal routing processor controls the crossbar switching unit to dynamically reconfigure an established signal routing path based on at least one signal characteristic of the input signal so as to generate an output signal output from the FFT circuit.

3. The RF detection system of claim 2, wherein at least one of a size and the operating mode of the dynamically reconfigurable channelizer is changed in response to reconfiguring the established signal routing path.

4. The RF detection system of claim 3, wherein the signal routing processor commands the crossbar switching circuit to establish a first signal routing path to invoke a first operating mode, and to establish a second signal routing path to invoke a second operating mode different from the first operating mode.

5. The RF detection system of claim 4, wherein the first operating mode processes a mixed output signal to generate a plurality of individual channels having a channel size defined by a bandwidth and a gain, and wherein the second mode processes the mixed output signal to generate a parallelization of a selected channel.

6. The RF detection system of claim 4, wherein the first signal routing path invokes a first configuration of the dynamically reconfigurable channelizer, and the second routing signal path invokes a second configuration of the dynamically reconfigurable channelizer different from the first configuration.

7. The RF detection system of claim 6, wherein the first configuration is a single-stage channelizer configuration having a wide bandwidth, and the second configuration is a multi-stage channelizer configuration having a narrow bandwidth that is less than the wide bandwidth.

8. The RF detection system of claim 7, wherein the multi-stage channelizer configuration includes a plurality of individual stages, each stage being driven by a single clock signal having a clock frequency, and wherein each stage outputs processed data at a data rate that is determined based on a level of the stage.

9. A dynamically reconfigurable channelizer included in an RF detection system, the dynamically reconfigurable channelizer comprising:
 a plurality of signal processing resources; and
 a crossbar switching circuit including a signal input to receive an input signal and a signal output to final processed signal, the crossbar switching circuit configured to selectively establish a plurality of different signal routing paths that connect the plurality of signal processing resources to the signal input and signal output,
 wherein the crossbar switching circuit reconfigures an established signal routing path based on a control signal generated from an electronic signal routing processor, thereby reconfiguring at least one of a size and an operating mode of the dynamically reconfigurable channelizer,
 wherein the crossbar switching circuit includes a resource output path that selectively connects a resource output of one of the signal processing resources or a combination of resource outputs of the signal processing resources in common with one another.

10. The dynamically reconfigurable channelizer of claim 9, further comprising an electronic signal routing processor that controls the crossbar switching unit to dynamically reconfigure an established signal routing path based on at least one signal characteristic of the input signal so as to generate an output signal.

11. The dynamically reconfigurable channelizer of claim 10, wherein the established signal routing path configures at least one of a size and an operating mode of the dynamically reconfigurable channelizer.

12. The dynamically reconfigurable channelizer of claim 11, wherein the signal routing processor commands the crossbar switching unit to establish a first targeted signal routing path that invokes a first a first configuration of the channelizer, and commands the crossbar switching circuit to establish a second target signal path that invokes a second configuration of the channelizer different from the first configuration.

13. The dynamically reconfigurable channelizer of claim 12, wherein the first configuration is a single-stage channelizer configuration having a wide bandwidth, and the second configuration is a multi-stage channelizer configuration having a narrow bandwidth that is less than the wide bandwidth.

14. The dynamically reconfigurable channelizer of claim 13, wherein the multi-stage channelizer configuration includes a plurality of individual stages, each stage being driven by a single clock signal having a clock frequency.

15. The dynamically reconfigurable channelizer of claim 14, wherein each stage outputs processed data at a data rate that is determined based on a level of the stage.

16. A method of operating an RF detection system to detect an object, the method comprising:
 receiving an input signal at the RF detection system;
 generating, via a signal routing processor, a routing control signal to select an operating mode of the RF detection system among a plurality of different operating modes;
 delivering the input signal to a signal input of a crossbar switching circuit;
 selectively reconfiguring, via the crossbar switching circuit, a signal routing path based on the routing control signal, the signal routing path connecting a plurality of signal processing resources to the signal input and a signal output of the crossbar switching circuit to invoke the selected operating mode; and
 outputting from the signal output a processed signal that indicates a detected object,
 wherein the crossbar switching circuit includes a resource output path that selectively connects a resource output of one of the signal processing resources or a combination of resource outputs of the signal processing resources in common with one another.

17. The method of claim 16, further comprising dynamically reconfiguring the established signal routing path based on at least one signal characteristic of the input signal so as to generate the processed signal.

18. The method of claim 17, further comprising changing at least one of a size and operating mode of the dynamically reconfigurable channelizer in response to reconfiguring the established signal routing path.

19. The method of claim 18, wherein changing the operating mode comprises:
 establishing, via the crossbar switching circuit, a first signal routing path to invoke a first operating mode; and
 establishing, via the crossbar switching circuit, a second signal routing path to invoke a second operating mode different from the first operating mode.

20. The method of claim 19, further comprising:
 establishing a single-stage configuration of the dynamically reconfigurable channelizer in response to invoking the first signal routing path, the single-stage configuration including a single channel that generates the processed signal; and
 establishing a multi-stage configuration of the dynamically reconfigurable channelizer in response to invoking the second routing signal path, the multi-stage configuration including a plurality of different channels that time-share the plurality of signal processing resources.

* * * * *